United States Patent [19]
Hurwitz et al.

[11] 3,853,758
[45] Dec. 10, 1974

[54] SEPARATION OF WASTE DYESTUFFS BY ADSORPTION PROCESS

[75] Inventors: Marvin J. Hurwitz, Elkins Park; David C. Kennedy, Malvern, both of Pa.; Carl J. Kollman, Cherry Hill, N.J.

[73] Assignee: Rohm and Haas Company, Philadelphia, Pa.

[22] Filed: July 2, 1973

[21] Appl. No.: 375,413

Related U.S. Application Data

[63] Continuation-in-part of Ser. No. 304,756, Nov. 7, 1972, abandoned, which is a continuation-in-part of Ser. No. 289,046, Sept. 14, 1972, abandoned, which is a continuation-in-part of Ser. No. 181,259, Sept. 16, 1971, abandoned.

[52] U.S. Cl.................. 210/27, 210/32, 210/37, 210/38
[51] Int. Cl............................................ B01d 15/04
[58] Field of Search............. 210/24, 26, 27, 30, 32, 210/40, 37, 38

[56] References Cited
UNITED STATES PATENTS

| | | | |
|---|---|---|---|
| 2,671,059 | 3/1954 | Smit | 210/24 |
| 2,785,998 | 3/1957 | Harding | 210/32 |
| 3,420,774 | 1/1969 | Oehme et al. | 210/30 |
| 3,531,463 | 9/1970 | Gustafson | 210/24 |
| 3,652,407 | 3/1972 | Paleos | 210/40 |
| 3,663,467 | 5/1972 | Albright | 210/24 |
| 3,720,626 | 3/1973 | Benzaria et al. | 210/30 |
| 3,803,030 | 4/1974 | Montanaro et al. | 210/32 |

*Primary Examiner*—Samih N. Zaharna
*Assistant Examiner*—Ivars Cintins
*Attorney, Agent, or Firm*—H. Jolyon Lammers

[57] ABSTRACT

Effluents from dye manufacturing and dyeing operations which contain waste dyestuffs are decolorized and their oxygen demand substantially reduced by passing at least a major part of the effluent through a bed of essentially non-ionogenic, macroreticular, water-insoluble, cross-linked polymeric adsorbent resin followed by contacting the partially decolorized effluent with a weak acid and/or aliphatic weak base ion exchange resin.

14 Claims, No Drawings

SEPARATION OF WASTE DYESTUFFS BY ADSORPTION PROCESS

This application is a continuation in part of Ser. No. 307,756 filed Nov. 17, 1972, which is a continuation in part of Ser. No. 289,046 filed Sept. 14, 1972, which is a continuation in part of Ser. No. 181,259 filed Sept. 16, 1971. Applications having Ser. Nos. 307,756; 289,046 and 181,259 are now abandoned.

This invention relates to the decolorization of effluents containing waste dyestuffs with a primary polymeric adsorbent and a secondary polymeric absorbent wherein said primary polymeric adsorbent is readily susceptible to regeneration. More particularly this invention relates to the decolorization of such effluents by utilization of a combination of a primary polymeric adsorbent composed of a non-ionogenic macroreticular adsorbent and a secondary absorbent comprising a weak-electrolyte ion exchange resin to remove the color bodies.

Industry is making major and expensive investments in minimizing stream pollution as governmental authorities adopt and enforce stricter water quality standards. One well-accepted technique involves the use of granular activated carbon to treat the subject class of plant effluents. As a commercial system, it is workable but expensive to build and to operate. While the carbon gives nearly complete removal of most dyestuffs, the desorption of the absorbed dyes is not practical.

Thus, the carbon must be totally discarded when its adsorption capacity is expended, or it must be regenerated thermally. Thermal regeneration entails considerable expense in construction of a regeneration furnace and accessories, plus the increased operating costs through carbon burn-off and attribution, requiring adsorbent replacement.

It has been suggested by the art to use ion exchange polymeric resins to absorb certain ionically charged dyestuffs from aqueous systems. Although these ion exchange resins can be used to absorb waste dyestuff from aqueous effluents, it is difficult to regenerate the ion exchange resins once the capacity of the ion exchange resins has been reached since the absorbed dye is strongly bonded to the ion exchange resin both by ionic and by Van der Waals forces. Accordingly, the ion exchange resins are subject to almost the same disadvantages as the activated carbon absorbents.

The general object of this invention is to provide a method of decolorizing effluents containing waste dyestuffs where the principal decolorizing agent is capable of economic regeneration for subsequent reuse.

A principal object of the present invention is to provide more economical processes for the effective separation of waste dyestuffs from effluents.

It is another object to provide adsorbent systems which can efficiently adsorb dyestuffs from a large volume of aqueous effluents.

It is still another object to provide an adsorption system for dyestuffs, particularly for effluent streams, which can be readily regenerated by chemical means.

A further object is to recover the dyestuffs in a useful concentrated form from waste streams for possible reutilization in the dyeing process, rather than being completely lost via disposal.

A further object is to provide for highly efficient and essentially complete decolorization of dye wastes which are intensely colored and highly visible.

A still further object is to provide a single system for effective removal of the plural classes of dyestuffs that may emanate from a single dyeing plant or dye producing facility.

It is another object in dyestuffs disposal to avoid the use of expensive processes utilizing destructive chemical reagents, such as chlorine or ozone.

It is another object to provide a system which will isolate the majority of the dyes in a concentrated solution in a volatile organic solvent regenerant such that, through volatilization and condensation, the solvent can be readily recovered for reuse as a regenerant, and the dyestuff can be isolated as a concentrated, readily disposable product.

The objects of this invention can be attained by contacting an aqueous effluent containing waste dyestuffs with a primary adsorbent comprising a non-ionogenic macroreticular resin in the form of particles, followed by contacting the effluent with a secondary absorbent comprising a weak electrolyte ion exchange resin. The non-ionogenic, water-insoluble, macroreticular resin has the property of chemically adsorbing dyestuffs on the surface of the resin (principally the surface of the channels in each particle) in the manner described in U.S. Pat. Nos. 3,531,463 and 3,663,467. Unlike the ion exchange resins, the bond between the non-ionogenic macroreticular resins and the adsorbed dyestuffs is relatively weak, thereby facilitating recovery of the adsorbed dyestuffs and regeneration of the nonionogenic macroreticular resin.

Although the non-ionogenic macroreticular resins are very effective in removal of most of the dyestuffs from the effluent, it is necessary to then contact the effluent with an ion exchange resin to complete the decolorization. The incomplete removal of dyestuff by the macroreticular resin may be thought of as being due to the relatively weak chemical equilibrium between the dyestuff in the aqueous effluent and the adsorbed dyestuff on the surface of the non-ionogenic macroreticular resin. Although an ion exchange resin is used in this process, it is clear that the non-ionogenic macroreticular resin increases the service life of the ion exchange resin. This is advantageous since the non-ionogenic resin can be regenerated more readily and economically than the ion exchange resin.

As indicated above, the process of the invention comprises the use of certain macroreticular, polymeric adsorbents in conjunction with, in the proper order, certain weak acid cation exchange resins and/or certain aliphatic weak base anion exchange resins (both preferably in the salt form), to remove dyes from dye-containing waste effluents. Further, the adsorbed dyes can be readily removed from the polymeric macroreticular non-ionogenic adsorbent by eluting with a polar, volatile, water-miscible organic solvent such as methanol, ethanol, acetone, methyl ethyl ketone, dimethyl formamide, etc.

The ion exchange resins are preferably regenerated by a novel two-step elution procedure which involves treating the weak acid resin with an aqueous mineral acid solution and the aliphatic weak base resin with an aqueous caustic solution to convert the resins to the free acid form and the free base form respectively. Following this step, the dyes are eluted with a solvent of the aforementioned class. Alternatively (but less satisfactorily) elution can be accomplished in a single step with an acidified or causticized solvent.

Following regeneration, the spent organic regenerants are passed to a distillation facility, wherein the solvent is vaporized and a solid (or accordingly concentrated liquid) dye waste is produced for recycle or disposal by incineration, burial or chemical degradation. The vaporized solvent is condensed for reuse in subsequent regenerations.

The process of the invention possesses all of the advantages, and none of the disadvantages of the systems of prior art, and therefore satisfies four major criteria for a successful system:

1. Complete Decolorization

In those dye classes where the primary treatment with the polymeric adsorbent does not give complete decolorization (<90 percent), the partially decolorized effluent is next treated with the proper weak based, and/or weak acid ion exchange resin, which does effect essentially complete decolorization, i.e., >90 percent 2. Universal Applicability The capability to select the proper adsorbents and ion exchange resins, based upon the generic composition of the dyestuffs waste, insures virtually universal applicability. Thus, this system's approach offers much wider applicability than when using either polymeric adsorbents or ion exchange resins alone.

3. Convenient Disposal of Recovered Dyes

All of the dyes adsorbed on the adsorbent, and most of the dyes sorbed on the ion exchange resins, will be desorbed as a concentrated solution in a volatile organic solvent, and can therefore be readily converted by means of distillation to an easily disposable solid or liquid waste, thereby avoiding creation of a secondary pollution problem.

4. Favorable Economics

Given the technical success of the process of the present invention, it clearly appears that the economics of decolorization will be more favorable than those of the most commonly used process granular activated carbon treatment. This is principally because of the very low regeneration costs which are possible through the use of a recoverable and reusable regenerant solvent.

There are certain classes of dyes, which at some point in their application are not soluble in water, but are present as suspensions or dispersions. Examples are the "disperse" dyes, and the oxidized form of "vat" dyes. Those dyes in true solution are the ones most effectively removed by the invention. Therefore, the process will not be as effective alone, when used for such insoluble materials. Hence, when these insoluble dyes are present in high proportions in a mixed waste effluent, it may be necessary to slightly modify the inventive process by adding a conventional separation step in conjunction with the treatments with the resins of this invention. Examples of such suitable steps are filtration, coagulation, flocculation, etc. The presence of small amounts of insoluble dyes in an effluent should not necessitate such a separation step.

The present process also provides a system which substantially reduces the oxygen demand (biological oxygen demand, and chemical oxygen demand) of these effluents.

In somewhat greater detail, the non-ionogenic, macroreticular resins useful in this invention are cross-linked polymers of the addition type which are insoluble in the aqueous effluent and which are not appreciably swollen by the dyes to be separated. The macroreticular polymers are employed as beads having a size in the range of about 0.1 to 3 millimeters average diameter, a porosity of at least 30 percent, a surface area of at least 100 up to 1,000 square meters per gram, and pores with an average pore diameter of 20 A. units ranging up to 200.

The macroreticular resins employed as the adsorbents herein are not claimed as new compositions of matter in themselves. Many of the known materials of this type are suitable. For example, there may be used the granular cross-linked polymers of this character prepared by suspension polymerization of polymerizable ethylenically unsaturated molecules comprising about 10 to 100 weight percent, preferably 40 to 100 weight percent, of at least one poly(vinylbenzene) monomer selected from the group consisting of divinylbenzene, trivinylbenzene, alkyl-divinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus, which are described in U.S. Pat. No. 3,531,463. Besides the homopolymers and copolymers of these poly(vinylbenzene) monomers, one or more of them may be copolymerized with up to 90 percent (by weight of the total monomer mixture) of (1) monoethylenically unsatruated monomers, or (2) polyethylenically unsaturated monomers other than the poly(vinylbenzenes) just defined or (3) a mixture of (1) and (2).

Examples of the alkyl-substituted di- and trivinylbenzenes are the various divinytoluenes, the divinylxylenes, divinylethylbenzene, 1,4-divinyl-2,3,5,6 tetramethylbenzene, 1,3,5-trivinyl-2,4,6-trimethylbenzene, 1,4-divinyl, 2,3,6-triethylbenzene, 1,2,4-trivinyl-3,5-diethylbenzene, 1,3,5-trivinyl-2-methylbenzene.

Examples of other non-ionogenic, polyethylenically unsaturated compounds, which can comprise up to 90 weight percent of the polymer, include: divinylnaphthalenes, diallyl phthalate, ethylene glycol diacrylate, ethylene glycol dimethacrylate, divinylsulfone, polyvinyl or polyallyl ethers of glycol, of glycerol, of pentaerythritol, of monothio or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N, N'-methylenedimethacrylamide, N,N'-ethylenediacrylamide, trivinylnaphthalenes, and polyvinylanthracenes.

Examples of non-ionogenic monoethylenically unsaturated monomers that may be used in making the granular macroreticular resins include methyl acrylate, ethyl acrylate, propyl acrylate, isopropyl acrylate, butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl, acrylate, propoxymethyl acrylate, propoxethyl acrylate, propoxypropyl acrylate, ethoxyphenyl acrylate, ethoxybenzyl acrylate, ethoxycyclohexyl acrylate, and the corresponding esters of methacrylic acid, ethylene, propylene, isobutylene, diisobutylene, styrene, vinyltoluene, vinyl chloride, vinyl acetate, vinylidene chloride, acrylonitrile, etc. Polyethylenically unsaturated monomers which ordinarily act as though they have only one such unsaturated group, such as isoprene, butadiene, and chloroprene, may be used as part of this monoethylenically unsaturated category. These monomers can be used in a concentration of up to 90 weight percent of the polymer.

A preferred proportion of the polyethylenically unsaturated compound of the polyvinyl cross-linking monomer is in the range of about 40 to 100 percent by weight of the total monomer mixture from which the resin is prepared. The suspension polymerization produces the resin in the form of granules or beads having an overall bead size in the range of about 0.1 to about 3 millimeters average diameter. The bead form of the resin is quite useful for the adsorption process of the present invention.

Alternatively, many of the non-ionogenic all aliphatic macroreticular resins of U.S. Pat. No. 3,663,467 can be used. These resins are essentially all aliphatic in character and crosslinked with a polyfunctional methacrylate (containing at least three methacrylate groups) which are characterized by superior hydrolytic stability, high wet density, good hydraulic characteristics and superior adsorbent properties. The preferred polyfunctional methacrylate is trimethylolpropane trimethacrylate or pentaerythritrol tetramethacrylate. However, the trimethacrylate of glycerol, glucose pentamethacrylate, sorbitol hexamethacrylate and the polyfunctional methacrylates of polyhydric alcohols of 3 to 6 carbon atoms in chain length may also be used. These polyfunctional methacrylates must contain at least three methacrylate groups as heretofore noted. Sutro polyols which are commercially available mixtures of essentially straight chain polyhydric alcohol of 3 to 6 carbon atoms may be used as the source of polyhydric alcohol.

These all-aliphatic polymers contain 10 to 100 percent by weight of the polyfunctional methacrylate having at least 3 methacrylate groups, and preferably from 40 to 100 percent by weight of said polyfunctional methacrylate. Typical aliphatic, non-aromatic, non-ionogenic, monoethylenically unsaturated comonomers which may be copolymerized with the polyfunctional methacrylate include, for example, ethylene, isobutylene, acrylonitrile, methacrylonitrile, acrylamide, methacrylamide; diacetone acrylamide, vinyl esters (including vinyl chloride, vinyl acetate, vinyl propionate, vinyl butyrate, vinyl laurate), vinyl ketones (including vinyl methyl ketone, vinyl ethyl ketone, vinyl isopropyl ketone, vinyl n-butyl ketone, vinyl hexyl ketone, vinyl octyl ketone, methyl isopropenyl ketone), vinyl ethers (including vinyl methyl ether, vinyl ethyl ether, vinyl propyl ether, vinyl isobutyl ether), vinylidene compounds (including vinylidene chloride, bromide, or bromochloride), esters of acrylic acid and methacrylic acid such as the methyl, ethyl, 2-chloroethyl, propyl, isopropyl, n-butyl, isobutyl, t-butyl, sec-butyl, amyl, hexyl, glycidyl, ethoxyethyl, cyclohexyl, octyl, 2-ethylhexyl, decyl, dodecyl, hexadecyl and octadecyl esters of these acids, hydroxyalkyl methacrylates and acrylates such as hydroxyethyl methacrylate and hydroxypropyl methacrylate, substituted acrylamides, such as N-monoalkyl, -N,N-dialkyl, and N-dialkyl-aminoalkylacrylamides or methacrylamides where the alkyl groups may have from 1 to 18 carbon atoms, such as methyl, ethyl, isopropyl, butyl, hexyl, cyclohexyl, octyl, dodecyl, hexadecyl, and octadecyl. If desired, difunctional methacrylates such as ethylene glycol dimethylacrylate or trimethylolpropane dimethacrylate can be used as comonomers.

As indicated above, we prefer that the polyvinyl monomers comprise at least 40 percent by weight of the monomers used to produce the first class of non-ionogenic macroreticular resins and that the poly (at least trifunctional) methacrylate comprise at least 40 percent by weight of the monomers used to produce the substantially all aliphatic non-ionogenic macroreticular resin since the higher the concentration of the indicated cross-linker the greater the surface area of the resin and the greater its capacity. Further, if the resin has less than about 40 percent by weight of the indicated cross-linker, the macroreticular resin is fragile and has relatively poor life.

The ion exchange resin or resins for treating the effluent from the non-ionogenic macroreticular resin can comprise one or more weak acid cation exchange resins of either the gel types (conventional) or the macroreticular type. Strong ion exchange resins should not be used since they are much harder to regenerate and usually must be disposed of without regeneration.

The adsorption or absorption processes may be carried out in simple batch operation or continuously. For example, the resin adsorbents or absorbents may be supported in suitable cells or vessels which, in most practical operations, normally take the form of a tower or column suitably packed with the resin particles which may be of any suitable size or mesh. The liquid mixture is passed through the resin mass at a suitable rate, such as from top to bottom, or vice versa so that one of the components is sorbed on the resin surfaces. Alternatively, the resin particles may pass in countercurrent relation to the liquid. For example, the particles may be continuously fed to the top of a column or tower into the bottom or which the liquid is fed continuously, the particles being removed from the bottom for subsequent treatment to remove or separate the substance sorbed.

In Table I below are set forth some of the more important and generally recognized generic classes of dyestuffs, which are amenable to purification by the present teachings. The listed classes are not an exhaustive compilation, but are intended to be illustrative.

TABLE I

Some Common Generic Classes of Dyes and General Treatment Procedures

| Class | Distinguishing Property or Functionality | Treatment Procedures |
|---|---|---|
| 1. Disperse | Non-ionic, water-insoluble | Polymeric adsorbent Filtration may be required |
| 2. Acid | Sulfonic Acid | Polymeric Adsorbent Plus Weak Base Resin |
| 3. Direct | Sulfonic Acid or Salt | do. |
| 4. Fiber Reactive | Generally Sulfonic Acid or Salt | do. |

TABLE I-Continued

Some Common Generic Classes of Dyes and General Treatment Procedures

| Class | Distinguishing Property or Functionality | Treatment Procedures |
|---|---|---|
| 5. Basic | Quarternary Ammonium Salt | Polymeric Adsorbent Plus Weak Acid Resin |
| 6. Mordant | Anionic Chelating Functionality | Polymeric Adsorbent Plus Weak Base Resin |
| 7. Vat | Anionic-reduced Form Insoluble-oxidized Form | Filtration, Polymeric Adsorbent Plus Weak Base Resin |

Among the water miscible polar organic solvents useful for removing said dyes from the non-ionogenic macroreticular resins are: one or more alcohols of 1 to 10 carbon atoms, volatile ketones of 3 to 10 carbons, alkyl esters, of aliphatic acids having from 1 to 10 carbons, dimethyl formamide, dimethyl acetamide, etc.

SCREENING EXAMPLE A

A. Batch Equilibration Experiments

A number of dyes, representing several of the most common generic dye classes, were screened by means of batch equilibration experiments using a single absorbent or adsorbent in order to illustrate that no single sorbent is (1) capable of decolorizing all aqueous dye compositions and (2) capable of being regenerated easily. The adsorption or absorption of these dyes by a number of polymeric adsorbents, ion exchange resins, and granular activated carbon was evaluated. In the experiments, 5.0 ml. of wet sorbent was shaken with 50 ml. of a 500 ppm dye solution for at least 3 days. Following equilibration, the optical density of the treated dye solution was measured at its spectral adsorbance maximum with spectrophotometer. Using the optical density of the untreated, influent solution, a percent removal was calculated for each dyesorbent combination.

The efficiency of regeneration was also determined using the loaded resins from the equilibrium experiments. The decolorized effluent was removed, and 50 ml of an appropriate regenerant was added; methanol for the polymeric adsorbents and activated carbon, 4% NaOH for the anion exchange resins, (Resin H, Resin I) and 4% $H_2SO_4$ for the cation exchange resins (Resin F, Resin G). The rate and extent of dye desorption was judged visually and rated quantitatively either as P (poor); F (fair); G (good); or E (excellent). These letter designations are also included in Table III for each dye-resin combination.

TABLE II

In the foregoing table the chemical nature of the evaluated resins is as follows:

| | |
|---|---|
| RESIN A | A non-ionogenic macroreticular copolymer of 50% divinylbenzene (DVB) plus 50% styrene-ethylvinyl benzene (U.S. Patent 3,531,463) |
| RESIN B | A non-ionogenic macroreticular polymer of 85% DVB, 15% ethyl vinyl benzene (U.S. Patent 3,531,463) |
| RESIN C | A non-ionogenic macroreticular polymer of 92% trimetholylpropane trimethacrylate and 8% trimethylol propane dimethacrylate |
| RESIN D | A non-ionogenic macroreticular resin formed by treating Resin A to obtain diaryl sulfoxide functionality |
| RESIN E | A macroreticular, strongly acidic cation exchange resin prepared by the sulfonation of Resin B (therefore it is 85% divinylbenzene with 15% ethylvinylbenzene) |
| RESIN F | A weakly acidic cation exchange resin copolymer of divinylbenzene and methacrylic acid (U.S. Pat. No. 2,551,519) |
| RESIN G | A macroreticular weakly basic, anion exchange resin prepared by the reaction of dimethylaminopropylamine with a copolymer of 90% methyl acrylate, 8% divinylbenzene and 2% diethyleneglycol-devinylether |
| RESIN H | A macroreticular, strongly basic, anion exchange resin prepared from the quaternization of Resin H above with methyl chloride |

In certain cases, two letter designations are employed, e.g., Resin B, Dye No. 10:P/G. In these cases, the dual regeneration scheme was evaluated; following treatment of the ion exchange resin with aqueous acid or alkali, the aqueous eluent was removed and methanol was added. Thus, in the case cited above, the regeneration of Resin F with acid was poor, but improved to good upon the addition of methanol.

From the data in Table III, certain broad conclusions can be drawn:

1) No adsorbent or absorbent resin is completely effective for disperse dyes. These, if present in high concentrations, are removed by a physical separation step, like filtration.

2) Activated carbon exhibits consistently strong adsorption but consistently poor regeneration;

3) The non-ionogenic polymeric adsorbents A through D vary considerably in strength of adsorption, but are most effective for basic dyes;

4) With few exceptions, the regeneration of the non-ionogenic polymeric adsorbents is excellent;

5) Anion exchange resins are consistently effective for dyes which contain anionic functional groups (acid, fiber reactive, and direct). The weak base resin, Resin G, is somewhat less effective, but is much more easily regenerated than the strong base Resin H.

6) Cation exchange resins are consistently effective for the basic dyes. The weak acid Resin F is more easily regenerated than the strong acid Resin E.

7) For weak acid and weak base resins, conversion of the resin to the free acid or free base forms respectively, followed by methanol treatment, gives more effective regeneration than simple regeneration with either aqueous acid or base.

The following examples are merely illustrations and should not be construed as limiting the scope of this invention:

EXAMPLE I

Column Decolorization Experiments - Single Dyes
Using the data in Table III as a guide, column decol-

TABLE III.—REMOVAL OF DYES BY VARIOUS ADSORBENT MATERIALS

Results of batch equilibration experiments

| System | | Dye class and dye number (see footnotes) | | | | | | | | | | | | | | | | |
|---|---|---|---|---|---|---|---|---|---|---|---|---|---|---|---|---|---|---|
| Absorbent resin | Type | Disperse | | | Acid | | | | | | Basic | | | | Fiber reactive | | Direct | |
| | | 1 [a] | 2 [b] | 3 [c] | 4 [d] | 5 [e] | 6 [f] | 7 [g] | 8 [h] | 9 [i] | 10 [j] | 11 [k] | 12 [l] | 13 [m] | 14 [n] | 15 [o] | 16 [p] | 17 [q] | 18 [r] |
| A | Polymeric absorption | 75E | 85E | 4.2 | 64.6E | 97.5E | 98.9G | 42.4G | 7.4 | 99.5E | 99.9E | 99.9E | 99.9E | 99.8F | 61.0E | 56.4E | 96.9E | 30.2E | 19.8E |
| B | do | 50E | 80G | 10.8G | 87.3E | 95.8E | 89.5G | 84.8F | 10F | 99.9E | 99.9E | 99.9G | 99.9E | 99.9G | 74.7G | 85.8G | 96.7E | 17.2E | 6.8 |
| C | do | 40E | 50G | 10.6P | 53.1G | 94.8G | 34.4F | 79.7P | 4.6F | 99.2E | 99.8E | 99.8G | 99.8E | 95.5G | 53.4G | 48.0G | 94.0E | 12.0E | 11.2E |
| D | do | 30G | 70G | 7.6P | 89.7E | 83.5G | 53.4P | 99.0F | 8.3F | 98.3E | 99.7P | 99.8F | 99.7F | 99.8F | 99.9F | 69.8F | 99.2F | 12.0E | 9.8 |
| E | do | 30P | 0 | 2.1 | 13.6P | 58.1F | 15.6F | | | | 99.9P | 99.9P | 99.9P | 98.8P | 99.7P | 0 | 30.0 | | |
| F | Strong acid, ion exchange resin | | | | | | | | | | 99.5P/G | 99.4P | 99.7F | 97.5F/G | 99.6F | 5.8 | 6.4 | | |
| G | Weak acid, ion exchange resin | | | 96.9E | 97.7F | 90.3F | 97.5G | 97.5G | 87.1 | 99.4P | | | | | | 0 | 49.6F/P | 99.7 | |
| H | Strong base, ion exchange resin | | | 99.8P | 99.7P | 99.8P | 99.5F | 99.8F | | | | | | | | 52.8F/G | 99.9P | | 99.9 |
| Calgon Filtrasorb | Granular activated carbon 300 | 85P | 90P | 99.0P | 98.7P | 97.4P | 97.4P | 99.1P | 99.6P | 99.8P | | 99.8P | 99.8P | 99.9F | 99.9P | 99.9P | 99.9P | 99.8P | 99.8P |

[a] Disperse Blue No. 7.  
[b] Disperse Yellow No. 3.  
[c] Acid Blue No. 45.  
[d] Acid Blue No. 23.  
[e] Neolan Yellow GR.  
[f] Calco Fast Wool Yellow.  
[g] Acid Fuchsin.  
[h] Arsenado I.  
[i] Acid Blue No. 25.  
[j] Basic Orange No. 21.  
[k] Astrazon Yellow (36).  
[l] Astrazon Blue B.  
[m] Crystal Violet.  
[n] Methylene Blue.  
[o] Reactive Blue No. 10.  
[p] Reactive Blue No. 18.  
[q] Direct Violet No. 14.  
[r] Director Blue No. 71.

orization experimental runs were performed with four representative dyes, and four differing combinations of macroreticular, non-ionogenic adsorbents and ion exchange resins. In these experiments, a 20 ml. column of non-ionogenic adsorbent resin was placed above a 10 ml. column of an ion exchange resin. The total flow rate of the system was maintained at 2.0 gpm/ft.$^3$ or 16 bed volumes per hour. In the first two runs (data in Table IV and V) below decolorization by the adsorbent alone (by visual observation) is somewhat inefficient, but the supplemental ion exchange polishing step gives greater than 99 percent total decolorization.

TABLE IV

Acid Blue No. 23 (dye 4 Table III) 500 ppm by weight.
Color = 4.28 Absorbance units at 600 mu Resin system = Non-ionogenic resin C/anion exchange resin G

| Bed Volumes Treated | Instantaneous % Leakage |
|---|---|
| 3 | 0.02 |
| 9 | 0.33 |
| 15 | 0.38 |
| 21 | 0.62 |
| 27 | 0.69 |
| 33 | 0.69 |
| 36 | 0.73 |
| Cumulative Decolorization | = 99.6% |

TABLE V

Methylene Blue (Dye 14 Table III) 500 ppm by weight.
Color = 95.6 Absorbance units at 650 mu.

Resin System = C/F

| Bed Volumes Treated | Instantaneous % Leakage |
|---|---|
| 3 | 0.09 |
| 9 | 0.15 |
| 15 | 0.17 |
| 21 | 0.19 |
| 27 | 0.23 |
| 33 | 0.32 |
| 36 | 0.40 |
| Cumulative Decolorization | = 99.8% |

For the Calco Fast Wool Yellow dye (Table VI), the degree of decolorization was not so high as the previous systems; not quite adequate for the resin system chosen. Clearly, however, the selection of a more efficient adsorbent (Table II), like Resin A in place of Resin D, should correct this situation.

TABLE VI

Calco Fast Wool Yellow (Dye 6, Table III) 500 ppm by weight.
Color = 4.68 Absorbance units at 430 mu Resin System = D/G (HSO$_4$)

| Bed Volumes Treated | Instantaneous % Leakage |
|---|---|
| 1 | 0.0 |
| 5 | 0.8 |
| 10 | 1.1 |
| 15 | 2.8 |
| 20 | 5.1 |
| 22 | 6.0 |
| Cumulative Decolorization | = 94.0% |

For the fourth dye studied, Astrazon Blue B, (Table VII) quantitative decolorization was achieved. This is not surprising since Table III shows both the ion exchange resin and the adsorbent to be highly effective for this dye.

TABLE VII

Astrazon Blue B (Dye 12, Table III)
500 ppm by weight. Color = 35.6 Absorbance Units at 430 mu Resin System = D/F (HSO$_4$)

| Bed Volumes Treated | Instantaneous % Leakage |
| --- | --- |
| 1 | 0.0 |
| 5 | 0.0 |
| 10 | 0.0 |
| 15 | 0.0 |
| 20 | 0.0 |
| 25 | 0.0 |
| Cumulative Decolorization | = 100.0% |

EXAMPLE II

A sample of a highly colored, acidic dye waste effluent was obtained from a dye manufacturer. This effluent was characterized as being composed of five separate dyes - all belonging to the generic class of acid dyes. Batch equibibrium screening experiments using a single adsorbent or absorbent gave the results set forth in Table VIII.

TABLE VIII

Conditions: 10 ml. of resin + 50 ml. of effluent, 3 day contact

Influent color = 89.5 Absorbance Units at 455 mu = 329,000 APHA Color units

| Adsorbent or Resin | Percent Decolorization |
| --- | --- |
| A | 4.1% |
| B | 84.6% |
| C | 65.7% |
| D | 82.1% |
| E | 15.5% |
| F | 28.5% |
| G | 77.5% |
| H | 99.1% |

As can be seen, the behavior of this mixture of acid dyes is consistent with the decolorization of the seven acid dyes of Table III.

A column of 40 ml. of Resin D was used to treat 10 bed volumes of the dye mixture which had been diluted 10-fold. The dilution was made to more closely approximate the actual effluent color from the dye mill.

An overall decolorization of 90 percent was obtained at a flow rate of 2 bed volumes/hour. This effluent was then passed over a 10 ml. column of Resin G at a flow rate of 8 bed volumes/hour. Complete decolorization was achieved as determined with spectrophotometer.

The Resin D column used in this example (to decolorize the commercial dye waste effluent) was regenerated with methanol at 2 bed volumes per hour.

TABLE IX

| Bed Volume of Regenerant | APHA Color of Effluent | Cumulative % Regeneration |
| --- | --- | --- |
| 0.5 | 9,000 | 2 |
| 1.0 | 223,000 | 44 |
| 1.5 | 211,000 | 83 |
| 2.0 | 48,000 | 92 |
| 2.5 | 16,000 | 95 |
| 3.0 | 10,000 | 97 |
| 3.5 | 7,000 | 98 |
| 4.0 | 5,000 | 99 |
| 4.5 | 3,000 | 100 |

A second loading cycle was run using the same column of Resin D and the same conditions of the first loading cycle. An identical degree of decolorization 90 percent - was attained.

EXAMPLE III

Columns of Resin B and Resin C which were loaded with the same diluted solution of commercial dye effluent (using the identical conditions described for Resin D) were also regenerated. Regeneration was performed with methanol using the conditions described with reference to Resin D, and a second loading cycle was run for both adsorbents.

The degree of decolorization of the first cycle is compared with that of the second cycle in Table X. The two values are nearly identical in all cases, which demonstrates the high efficiency of methanol regeneration for the polymeric adsorbents.

TABLE X

| Adsorbent | Cycle No. 1 | % Decolorization Cycle No. 2 |
| --- | --- | --- |
| Resin B | 85% | 83% |
| Resin C | 80% | 80% |
| Resin D* | 90% | 90% |

*Previously reported in Example II.

EXAMPLE IV

Four 10 ml. columns of Resin G were prepared and converted to the bisulfate form by treatment with 5 bed volumes of 10 percent sulfuric acid. Fifty bed volumes of a 500 ppm solution of Acid Blue No. 23 (Dye 4, Table III) were passed through the columns at a flow rate of 16 bed volumes per hour. Complete decolorization was achieved. Each of the four columns was then regenerated by a different procedure outlined below and the efficiency of regeneration was determined. The results reported in Table XI.

TABLE XI

| | Regenerant | Result |
| --- | --- | --- |
| a. | 8 bed volumes of a 4% NaOH aqueous solution | Color removed = 26% Resin still highly colored |
| b. | 8 bed volumes of methanol | No color removed |
| c. | 8 bed volumes of a 4% NaOH solution in methanol | Color removed = 86% Resin light blue |
| d. | 3 bed volumes of a 4% NaOH aqueous solution followed by 5 bed volumes of methanol | Color removed = 100% Resin completely colorless |

EXAMPLE V

Four 10 ml columns of Resin F were prepared and converted to the sodium form by treatment with 5 bed volumes of a 4 percent sodium hydroxide solution. Fifty bed volumes of a 500 ppm solution of Basic Orange No. 21 (Dye 10, Table III) were passed through the columns at a flow rate of 16 bed volumes per hour. Complete decolorization was achieved. Each of the four columns was then regenerated by a different procedure outlined below and the efficiency was determined. The results are reported in Table XII:

TABLE XII

| | Regenerant | Result |
|---|---|---|
| a. | 8 bed volumes of a 10% aqueous acid solution | Color removed = 39% Resin still highly colored |
| b. | 8 bed volumes of methanol | Color removed = 90% Resin yellow |
| c. | 8 bed volumes of 10% sulfuric acid in methanol solution | Color removed = 98% Resin still light yellow |
| d. | 3 bed volumes of a 10% aqueous sulfuric acid solution followed by 5 bed volumes of methanol | Color removed = 100% Resin completely colorless |

The foregoing regeneration experiments (Examples IV and V) clearly show the utility of the preferred two-step regeneration procedure for ion exchange resins. In both cases, regeneration was more efficient and more dye was recovered in the organic solvent when the resin was first converted to its un-ionized form by treatment with caustic or acid.

EXAMPLE VI

A mixture of a fiber-reactive dye (Dye No. 16, of Table III) and a basic dye (Dye No. 13, Table III) was decolorized to test the feasibility of the total system. Three columns were prepared in tandem containing: (1) 20 ml of Resin C, (2) 5 ml of Resin F (Na ion form) and (3) 5 ml of Resin G ($HSO_4$ ion form). The influent, a mixture of 250 ppm of each of the above dyes, was passed through the resin system at a rate of 320 ml per hour (8 Bed Volumes per hour). The system was run for 6 hours, during which 50 Bed Volumes of effluent (2 liters) were collected. No color should be detected in the effluent, showing that the system was 100 percent effective in removing the dyes from this complex mixture.

EXAMPLE VII

To further demonstrate the practical utility of the process, dye waste effluents were obtained from a dyeing and finishing establishment. The average, relative composition of the effluent, according to generic dye classes, is as follows:

Average Effluent Composition

| Dye Class | Percent |
|---|---|
| Acid | 5.4 |
| Basic | 2.0 |
| Direct | 77.7 |
| Dispersed | 13.5 |
| Sulfur | 1.4 |
| Total | 100.0 |
| All Anionic Dyes | 83.1 |
| All Cationic Dyes | 3.4 |
| Neutral Dyes (Insoluble) | 13.5 |

Since anionic dyes predominate and cationic dyes are in the minority, the decolorizing system chosen for this effluent consisted of Resin C followed by Resin G. The amount of insoluble dyes is not sufficiently high to necessitate filtration or other physical separation steps.

In addition to the dyestuffs there are present in the effluent an even greater quantity of colorless organic compounds used as dyeing assistants and finishing agents. These materials are primarily detergents, wetting agents, defoamers and sizing compounds.

A typical dye effluent is brown in color (because of the complex mixture of dyes) and measures 1000 APHA Color Units. It contains 200 ppm BOD and 450 ppm COD — almost none of which is attributable to the dyestuffs themselves. The salt content is roughly 2 percent by weight. The composition of the effluent can differ widely from the averages given above at any particular moment. This is an advantage in evaluating the process of the invention — as it gives a broad exposure to effluent compositions.

A series of experiments was performed to characterize the loading characteristics of the Resin C/Resin G system for decolorizing dye waste effluents of the type described above.

In Table XII are summarized the results of eight loading experiments with different influents. In addition to color removal, COD and BOD removals are also tabulated. Removal of BOD and COD is quite good and compliments the color removal capabilities of the system.

EXAMPLE VIII

Efficient regeneration is manifested in the retention of loading performance with multiple cycles. The results of some limited multiple cycling experiments are presented in Table XIV. It can be seen from the data that the decolorization efficiency actually improves slightly after the first cycle and then remains constant. In another multiple cycling experiment the decolorization efficiency increased even more on the first three cycles: 96.0 percent → 97.2 percent → 98.7 percent. These experiments again support the view that a long resin life is probable.

TABLE XIV

Multiple Cycling of Resin C/G System

| Loading Conditions: | 12 BV/hr. flow rate 50 bed volume loading cycle Influent Color = 1430 ppm APHA For Experiment 1; 4750 ppm APHA For Experiment 2. | |
|---|---|---|
| Regeneration Conditions: | Resin C; | 2.0 bed volumes of methanol, 2 BV/hr. |
| | Resin G; | 1 bed volume 4% NaOH 2.0 bed volumes methanol 1.0 bed volume 10% $H_2SO_4$, 2 BV/hr. |

Cumulative % Decolorization

| | Cycle No. 1 | Cycle No. 2 | Cycle No. 3 |
|---|---|---|---|
| Experiment 1 | 94.5% | 96.0% | 95.8% |
| Experiment 2 | 96.0% | 97.2% | 98.7% |

TABLE XIII

| | | Color (APHA) | | | BOD (ppm) | | | COD | | |
|---|---|---|---|---|---|---|---|---|---|---|
| Run | Conditions* | Influent | Effluent | Removed | Influent | Effluent | Removed | Influent | Effluent | Removed |
| 1 | 9/50 | 645 | 13 | 98% | 212 | 52 | 75% | 537 | 67 | 88% |
| 2 | 12/50 | 540 | 38 | 93% | 301 | 131 | 56% | 444 | 134 | 70% |
| 3 | 12/50 | 550 | 22 | 96% | 278 | 135 | 55% | 315 | 138 | 56% |
| 4 | 8/25 | 1940 | 55 | 97% | 120 | 92 | 23% | 511 | 229 | 52% |

TABLE XIII-Continued

| Run | Conditions* | Color (APHA) | | | BOD (ppm) | | | COD | | |
|---|---|---|---|---|---|---|---|---|---|---|
| | | Influent | Effluent | Removed | Influent | Effluent | Removed | Influent | Effluent | Removed |
| 5 | 8/50 | 2200 | 67 | 97% | 95 | 40 | 57% | 337 | 119 | 65% |
| 6 | 12/50 | 1100 | 34 | 97% | 326 | 114 | 65% | 492 | 209 | 68% |
| 7 | 8/34 | 630 | 25 | 96% | 263 | 182 | 45% | 567 | 306 | 46% |
| 8 | 8/50 | 430 | 30 | 93% | 82 | 61 | 26% | 413 | 90 | 78% |
| | AVERAGE | 1006 ppm | 35 ppm | 96% | 200 ppm | 111 ppm | 46% | 452 ppm | 161 ppm | 64% |

*Conditions: No. BV/hr./No. BV.   Resin C/Resin G = 1:1  Resin G is always in the $HSO_4^-$ form for loading cycles

EXAMPLE IX

As was discussed earlier, the established art in the field of dye waste treatment is granular activated carbon system utilizing external, thermal regeneration. Several experiments were conducted to compare the performance of the Process of the invention with that of several of the widely used brands of granular activated carbon. The results of the study are seen in Table XV. It is apparent that, at equivalent flow rate (12 BV/hr.) none of the activated carbons come close to the performance of this process.

TABLE XV

| Conditions: | Flow rate = 12 bed volumes/hour |
| | Influent color = 2570 ppm APHA |
| | Cycle length = 80 bed volumes |

| System | Cumulative % Decolorization |
|---|---|
| Resin C/G | 95.5% |
| Carbon No. 1 | 84.0% |
| Carbon No. 2 | 83.0% |
| Carbon No. 3 | 78.5% |
| Carbon No. 4 | 66.5% |

PREPARATIVE EXAMPLE A

Synthesis of a non-ionogenic Trimethylolpropane Trimethacrylate Polymer (Resin C)

6000 grams of water, 180 grams (3.0 percent of water) of sodium chloride, 6 grams (0.2 percent of organic phase) of gelatin, and 72 grams of a 12.5 wt. percent aqueous solution of sodium polyacrylate (0.3 wt. percent of organic phase is sodium polyacrylate) are mixed in a twelve liter flask until a homogeneous solution resulted. After the pH of the aqueous solution is adjusted to 8 to 9 with concentrated aqueous ammonia, a mixture of 900 grams (2.66 moles) of commercial trimethylolpropane trimethacrylate with 9 grams (1.0 wt. percent of monomer) of lauroyl peroxide, and 2,100 grams (22.79 moles, 70 wt. percent of the organic phase) of toluene is introduced into the reactor. (The commercial trimethylolpropane trimethacrylate analyzed by gas-liquid chromatography to be 92 percent triester and 8 percent diester, i.e., trimethylolpropane dimethacrylate). The dispersion of organic liquid in an aqueous phase is prepared at ambient temperature 80 rpm with on-off agitation cycles until only droplet and aqueous phases remains in the absence of stirring. Formation of the dispersion requires approximately 15 minutes. The droplets are polymerized under nitrogen at 65°C. for 20 hours into solid, opaque spheres, washed, and dried. The yield of dried copolymer is 896 grams of 99.5 percent of theory. The physical characteristics of the porous beads are:

| | |
|---|---|
| appearance | opaque white |
| apparent density, g.ml.$^{-1}$ | 0.564 |
| skeletal density, g.ml.$^{-1}$ | 1.245 |
| Porosity, Fol. % | 55 |
| surface area, m$^2$g.$^{-1}$ | 450 |
| average pore diameter, Å | 90 |

PREPARATIVE EXAMPLE B

Synthesis of a non-ionogenic Porous Copolymer Containing Diaryl Sulfoxide Functionalities (Resin D)

To a blackened 1-liter flask, equipped with a stirrer, condenser, gas inlet tube, and a thermometer area are added 63.0 grams of dried Resin A (DVB polymer) and 200 grams of ethylene dichloride. A sweep of dry nitrogen is started and the beads are allowed to swell for 30 minutes at room temperature with agitation.

In a separate flask, 65.0 grams of thionyl chloride is dissolved in 100 grams of ethylene dichloride and 53.4 grams of solid, anhydrous aluminum chloride are added to the stirring solution while maintaining the temperature under 35°C. After all the aluminum chloride has dissolved, the mixture is added to the pre-swollen beads at a rate such that the temperature remains below 35°C.*

*During this step and subsequent steps until the reaction is quenched, hydrogen chloride gas is liberated. Precautions are taken so that the batch will not purge as a result of rapid gas evolution. The times and conditions given here should prevent such rapid liberation of hydrogen chloride.

The flask is stirred at room temperature (<35°C.) for 2 hours and then is slowly heated over a period of about 1 hour to reflux temperature (80°-85°C.). Reflux is maintained for an additional 2 hours, and then the reaction is cooled to about 10°C. in an ice bath. There then is added 100.0 grams of benzene, at a rate such that the temperature does not exceed 30°C. After all the benzene has been added, the reaction mixture is stirred at room temperature (<35°C.) for 1 hour. Heat is then slowly applied to attain reflux and the reaction is maintained at reflux temperature for 2 hours. The mixture is cooled to 15°C. and then quenched by pouring same into 500 ml. of an ice-cold, 10 percent hydrochloric acid — water mixture at a rate such that the temperature does not exceed 50°C.

The quench solution is stirred for two hours to decompose aluminum salts after when the beads are filtered and washed with water. The beads are retransferred as a slurry to the reaction flask and an azeotrope distillation procedure is performed to remove imbibed organic solvents. The excess water is siphoned from the flask and the beads are washed with additional water until the wash water is neutral to pH paper. Excess water is siphoned from the flask and the beads are packed out wet. A 20 to 30 mesh cut is dried and measured for physical properties.

Appearance: Opaque brown beads
Elemental Analysis:
- 8.28% S
- 5.26% O
- 1.61% Cl
- 75.29% C
- 7.24% H Apparent Density: 0.731 grams/cm³
Skeletal Density: 1.218 grams/cm³
Porosity: 39.9 volume %
Surface Area: 319 meters²/gram
Average Pore Diameter: 68 Angstroms

PREPARATIVE EXAMPLE C

Synthesis of Resin G

Into a three-liter round bottom flask are placed 980 grams of aqueous liquid and 1.100 grams of immiscible organic liquid. The composition of the aqueous phase is 1080 grams of water, 32.4 grams of salt, 0.216 grams of sodium nitrite, 0.162 grams of gelatin and 16.2 grams of hydrolyzed styrene-maleic anhydride copolymer (dissolved in water).

The composition of the organic layer is 615.0 grams of methyl acrylate, 99.0 grams of commercial divinyl benzene (57.1 percent DVB) 14.4 grams of diethylene glycol divinyl ether, 243.0 grams of di-isobutyl ketone (DIBK) and 7.16 grams of lauroyl peroxide.

After flushing the systems with nitrogen, the immiscible mixture is stirred at room temperature (about 25°C.) at 145 rpm, with as many on-off stirring cycles as are necessary to disperse completely all the organic liquid into fine droplets (0.2–0.5 mm diameters) in the aqueous layer. After a stable dispersion has formed, heat is applied until the temperature reaches 65°C. The reaction mixture is maintained at 65°C. with the same stirring for 20 hours.

After the polymerization is complete, the flask is arranged so that the DIBK can be azeotropically distilled from the flask. After removal, the beads are washed and then filtered to remove excess water. The resulting copolymer is dried in a stream oven at a maximum temperature of 80°C.

The dried copolymer (500 grams) along with 1,483 grams of dimethylaminopropylamine are charged to a stirred pressure reactor. The reactor is sealed, stirring is started and heat is applied. The temperature of the reactor is allowed to cool to room temperature. The beads are drained, washed first with methanol and then with water until the wash water is neutral to pH paper. The final product is in the form of opaque white beads of 11 percent solids, and with an anion exchange capacity of 5.3 milliequivalents per gram.

We claim:

1. A sequential process for separating a dyestuff from an aqueous medium containing at least one dissolved dyestuff comprising:
   a. Contacting the aqueous medium with particles of an essentially non-ionogenic, macroreticular, water-insoluble, polymeric adsorbent in the form of beads having an overall bead size in the range of about 0.1 to 3 millimeters average diameter, a porosity of at least 30 percent, a surface area of at least 100 up to 1,000 square meters per gram, and pores with an average pore diameter of 20 to 200 A. units; and
   b. Treating the effluent from the foregoing step with particles selected from a class consisting of the salt forms of a weak acid ion exchange resin, an aliphatic weak base ion exchange resin and a combination of a weak acid and an aliphatic weak base ion exchange resin, and
   c. Eluting the adsorbed dyestuffs from the non-ionogenic adsorbent with a polar, volatile, water-miscible organic solvent selected from the group consisting of one or more volatile ketones of 3 to 10 carbons, linear and branched alkanols having 1 to 10 carbons, dimethyl formamide and dimethyl acetamide and;
   d. Eluting and regenerating the ion exchange resin by treating the resin with
      i. an aqueous solution of an appropriate base or acid which will convert the resin to the hydroxide or hydrogen form;
      ii. eluting the adsorbed dye-stuffs with a polar, water-miscible organic solvent regenerant selected from one or more volatile ketones of 3 to 10 carbons, linear and branched alkanols having 1 to 10 carbon, alkyl esters of aliphatic acids from 1 to 10 carbons, and dimethyl formamide, and
      iii. reconverting the regenerated resin to its salt form by treating with an aqueous solution of one of a mineral acid or an alkali metal hydroxide.

2. The process of claim 1, wherein said nonionogenic macroreticular polymer comprises at least 40 percent by weight of polymerized poly(vinylbenzene) monomers selected from the group consisting of divinylbenzene trivinylbenzene, alkyl divinylbenzenes having from 1 to 4 alkyl groups of 1 to 2 carbon atoms substituted in the benzene nucleus, alkyl trivinylbenzenes having from 1 to 3 alkyl groups of 1 to 2 carbon atoms substituted in the benzene nucleus and mixtures thereof.

3. The process of claim 2, wherein the adsorbent comprises a copolymer of about 50 percent by weight divinylbenzene and about 50 percent by weight styrene and ethylvinylbenzene.

4. The process of claim 1, wherein said nonionogenic macroreticular polymer comprises at least 40 percent by weight of a polyfunctional methacrylate containing at least three methacrylate groups.

5. The process of claim 4, wherein the adsorbent comprises a copolymer of about 92 percent by weight of a polyfunctional methacrylate containing at least three methacrylate groups and about 8 percent by weight of a polyfunctional methacrylate containing two methacrylate groups.

6. The process of claim 1, wherein the aqueous medium additionally contains substantial amounts of insoluble dyestuffs, and a physical separation step is interposed ahead of said sorption step, whereby said insoluble dyestuffs are substantially removed.

7. The process of claim 1, wherein the said dyestuffs contain an anionic group and the weak ion exchange resin is a copolymer of about 90 percent methyl acrylate, about 8 percent divinylbenzene and about 2 percent, diethyleneglycoldivinylether, which has been aminolized with an alkyl amine.

8. The process of claim 1, wherein said dyestuffs contain a cationic group and the ion exchange resin is a copolymer of divinylbenzene and an alpha, beta-ethlenically unsaturated acid selected from the group consisting of acrylic acid and methacrylic acid.

9. The process of claim 1, in which the dye loaded regenerant solvent is distilled to recover the regenerant solvent to reuse and to recover the dyestuffs in a highly concentrated liquid or solid form.

10. The process of claim 2, wherein the adsorbent is a copolymer of about 85 percent by weight divinylbenzene and about 15% by weight ethylvinylbenzene.

11. The process of claim 1, wherein the adsorbent is a copolymer of about 50 percent by weight divinylbenzene which has been postreacted to incorporate divinyl sulfoxide functionality.

12. The process of claim 1, wherein the treated effluent is reused in dye manufacturing or dyeing operations.

13. The process of claim 1, wherein the water soluble dyestuff substance is desorbed from the adsorbent of step (a) by contacting said resin with methanol.

14. The process of regenerating a weak ion exchange resin in its salt form substantially loaded with dyestuffs, comprising a. Treating the dyestuffs loaded resin with an aqueous solution of an appropriate base or acid which will convert the resin to the hydroxide or hydrogen form;

b. Eluting the adsorbed dyestuffs with a polar, water-miscible organic solvent regenerant selected from one or more volatile ketones of 3 to 10 carbons, linear and branched alkanols having 1 to 10 carbons, alkyl esters of aliphatic acids from 1 to 10 carbons, and dimethyl formamide; and c. Reconverting the regenerated resin to its salt form by treating with an aqueous solution of one of a mineral acid or an alkali metal hydroxide.

* * * * *